US012496058B2

(12) United States Patent
Germain

(10) Patent No.: US 12,496,058 B2
(45) Date of Patent: Dec. 16, 2025

(54) SENSOR-BASED ARTHROSCOPIC ANCHOR SYSTEM

(71) Applicant: Biomet Manufacturing, LLC, Warsaw, IN (US)

(72) Inventor: Aaron Germain, San Jose, CA (US)

(73) Assignee: Biomet Manufacturing, LLC, Warsaw, IN (US)

( * ) Notice: Subject to any disclaimer, the term of this patent is extended or adjusted under 35 U.S.C. 154(b) by 450 days.

(21) Appl. No.: 18/086,190

(22) Filed: Dec. 21, 2022

(65) Prior Publication Data

US 2023/0200800 A1 Jun. 29, 2023

Related U.S. Application Data

(60) Provisional application No. 63/294,740, filed on Dec. 29, 2021.

(51) Int. Cl.
| | |
|---|---|
| *A61B 17/04* | (2006.01) |
| *A61B 17/06* | (2006.01) |
| *A61B 17/16* | (2006.01) |
| *A61B 34/10* | (2016.01) |
| *A61B 17/00* | (2006.01) |
| *A61B 90/00* | (2016.01) |

(52) U.S. Cl.
CPC .... *A61B 17/0401* (2013.01); *A61B 17/06166* (2013.01); *A61B 17/1604* (2013.01); *A61B 34/10* (2016.02); *A61B 2017/00022* (2013.01); *A61B 2017/00128* (2013.01); *A61B 2017/0409* (2013.01); *A61B 2034/108* (2016.02); *A61B 2090/066* (2016.02)

(58) Field of Classification Search
CPC ... A61B 17/16; A61B 17/1604; A61B 5/4509; A61B 2017/0409
See application file for complete search history.

(56) References Cited

U.S. PATENT DOCUMENTS

| | | | |
|---|---|---|---|
| 2001/0032517 A1* | 10/2001 | Reinemann, Jr. ..... | G01L 5/0033 73/826 |
| 2007/0233065 A1* | 10/2007 | Donofrio ............. | A61B 8/4472 606/309 |
| 2010/0262239 A1* | 10/2010 | Boyden ..................... | A61F 2/30 600/587 |
| 2019/0365346 A1* | 12/2019 | Elliot ..................... | A61B 6/505 |
| 2020/0030036 A1* | 1/2020 | Forstein ................. | A61B 34/10 |
| 2022/0087671 A1* | 3/2022 | Somerson .......... | A61B 17/0401 |

\* cited by examiner

*Primary Examiner* — Alexander J Orkin
(74) *Attorney, Agent, or Firm* — SCHWEGMAN LUNDBERG & WOESSNER, P.A.

(57) ABSTRACT

Disclosed herein are systems for implanting anchors and method of use thereof. The systems and methods can include an anchor punch, an anchor inserter, and a controller. The anchor punch can include an anchor punch sensor. The anchor inserter can include an anchor inserter sensor. The controller can be in electrical communication with the anchor punch sensor and the anchor inserter sensor. The controller can be operative to perform operations that include receiving an anchor punch sensor signal from the anchor punch sensor, recommending a number of anchors to be implanted in the bone based on a first estimate of the bone quality, receiving an anchor inserter signal from the anchor inserter sensor, and recommending a number of additional anchors to be implanted in the bone based on a second estimate of the bone quality.

20 Claims, 3 Drawing Sheets

SENSOR-BASED ARTHROSCOPIC ANCHOR SYSTEM

CLAIM OF PRIORITY

This application claims the benefit of U.S. Provisional Patent Application Ser. No. 63/294,740, filed on Dec. 29, 2021, the benefit of priority of which is claimed hereby, and which is incorporated by reference herein in its entirety.

FIELD OF THE DISCLOSURE

The present disclosure relates generally to surgical anchor systems and methods of use thereof. More specifically, the present disclosure relates to surgical anchor systems for implanting one or more anchors into a bone and securing one or more sutures thereto and methods of use thereof.

BACKGROUND

Due to injury, aging, and/or other circumstances, a joint, ligament, and/or tendent can become damaged. Surgery can be used to repair the anatomical structure. As part of the repair, anchors can be implanted into bone and sutures used to stabilize the anatomical structure.

SUMMARY

The following, non-limiting examples, detail certain aspects of the present subject matter to solve the challenges and provide the benefits discussed herein, among others.

Example 1 is a system for implanting one or more anchors in a bone having a bone quality, the system comprising: an anchor punch comprising an anchor punch sensor; an anchor inserter comprising an anchor inserter sensor; a controller in electrical communication with the anchor punch sensor and the anchor inserter sensor, the controller operative to perform operations comprising: receiving an anchor punch sensor signal from the anchor punch sensor, the anchor punch sensor signal correlated to a first estimate of the bone quality, recommending a number of anchors to be implanted in the bone based on the first estimate of the bone quality, receiving an anchor inserter signal from the anchor inserter sensor, the anchor inserter signal correlated to a second estimate of the bone quality, and recommending a number of additional anchors to be implanted in the bone based on the second estimate of the bone quality.

In Example 2, the subject matter of Example 1 optionally includes wherein recommending the number of anchors to be implanted in the bone comprises illuminating one or more lights corresponding to the number of anchors to be implanted in the bone.

In Example 3, the subject matter of any one or more of Examples 1-2 optionally include wherein recommending the number of additional anchors to be implanted in the bone comprises illuminating one or more lights corresponding to the number of additional anchors to be implanted in the bone.

In Example 4, the subject matter of any one or more of Examples 1-3 optionally include wherein the operations further comprise determining a hardness of the bone based on the anchor punch sensor signal.

In Example 5, the subject matter of any one or more of Examples 1-4 optionally include wherein the operations further comprise determining a hardness of the bone based on the anchor inserter sensor signal.

In Example 6, the subject matter of any one or more of Examples 1-5 optionally include wherein the anchor punch sensor comprises a durometer.

In Example 7, the subject matter of any one or more of Examples 1-6 optionally include wherein the anchor inserter sensor comprises a torque gauge.

In Example 8, the subject matter of any one or more of Examples 1-7 optionally include a suture; and a suture strain sensor in electrical communication with the controller and attached to the suture, wherein the operations further comprise: receiving a suture signal from the suture strain sensor; determining a tension within the suture based on the suture signal; and providing an indication when the tension is within a predetermined tension range.

In Example 9, the subject matter of Example 8 optionally includes determining the predetermined tension range based on at least one of the first and second estimates of the bone quality.

In Example 10, the subject matter of any one or more of Examples 8-9 optionally include wherein providing the indication when the tension is within the predetermined tension range comprises activating an audible alarm.

Example 11 is a system for implanting one or more anchors in a bone having a bone quality, the system comprising: an anchor punch comprising a diameter, an anchor inserter comprising a torque gauge; a controller in electrical communication with the durometer and the torque gauge, the controller operative to perform operations comprising: receiving an anchor punch sensor signal from the durometer, the anchor punch sensor signal correlated to a first estimate of the bone quality, recommending a number of anchors to be implanted in the bone based on the first estimate of the bone quality, receiving an anchor inserter signal from the anchor inserter sensor, the anchor inserter signal correlated to a second estimate of the bone quality, and recommending a number of additional anchors to be implanted in the bone based on the second estimate of the bone quality.

In Example 12, the subject matter of Example 11 optionally includes wherein recommending the number of anchors to be implanted in the bone comprises illuminating one or more lights corresponding to the number of anchors to be implanted in the bone.

In Example 13, the subject matter of any one or more of Examples 11-12 optionally include wherein recommending the number of additional anchors to be implanted in the bone comprises illuminating one or more lights corresponding to the number of additional anchors to be implanted in the bone.

In Example 14, the subject matter of any one or more of Examples 11-13 optionally include wherein the operations further comprise determining a hardness of the bone based on the anchor punch sensor signal.

In Example 15, the subject matter of any one or more of Examples 11-14 optionally include wherein the operations further comprise determining a hardness of the bone based on the anchor inserter sensor signal.

In Example 16, the subject matter of any one or more of Examples 11-15 optionally include a suture; and a suture strain sensor in electrical communication with the controller and attached to the suture, wherein the operations further comprise: receiving a suture signal from the suture strain sensor; determining a tension within the suture based on the suture signal; and providing an indication when the tension is within a predetermined tension range.

In Example 17, the subject matter of Example 16 optionally includes determining the predetermined tension range based on at least one of the first and second estimates of the bone quality.

In Example 18, the subject matter of any one or more of Examples 16-17 optionally include wherein providing the indication when the tension is within the predetermined tension range comprises activating an audible alarm.

Example 19 is a method for implanting one or more anchors in a bone having a bone quality, the method comprising: receiving, at a controller, an anchor punch sensor signal from an anchor punch sensor, the anchor punch sensor signal correlated to a first estimate of the bone quality; determining, by the controller, a number of anchors to be implanted in the bone based on the first estimate of a bone quality; providing, by the controller, an indication of the number of anchors to be implanted in the bone; receiving, at the controller, an anchor inserter signal from an anchor inserter sensor, the anchor inserter signal correlated to a second estimate of the bone quality; determining, by the controller, a number of additional anchors to be implanted in the bone based on the second estimate of the bone quality; and providing by the controller, an indication of the number of additional anchors to be implanted in the bone.

In Example 20, the subject matter of Example 19 optionally includes wherein proving the indication of the number of anchors to be implanted in the bone comprises illuminating one or more lights corresponding to the number of anchors to be implanted in the bone.

In Example 21, the subject matter of any one or more of Examples 19-20 optionally include wherein providing the indication of the number of additional anchors to be implanted in the bone comprises illuminating one or more lights corresponding to the number of additional anchors to be implanted in the bone.

In Example 22, the subject matter of any one or more of Examples 19-21 optionally include determining a hardness of the bone based on the anchor punch sensor signal.

In Example 23, the subject matter of any one or more of Examples 19-22 optionally include determining a hardness of the bone based on the anchor inserter sensor signal.

In Example 24, the subject matter of any one or more of Examples 19-23 optionally include receiving a suture signal from a suture strain sensor attached to a suture; determining a tension within the suture based on the suture signal; and providing an indication when the tension is within a predetermined tension range.

In Example 25, the subject matter of Example 24 optionally includes determining the predetermined tension range based on at least one of the first and second estimates of the bone quality.

In Example 26, the subject matter of any one or more of Examples 24-25 optionally include wherein providing the indication when the tension is within the predetermined tension range comprises activating an audible alarm.

In Example 27, the apparatuses; sutures, methods and/or systems of any one or any combination of Examples 1-26 can optionally be configured such that all elements or options recited are available to use or select from.

Example 28 is a system for implanting one or more anchors in a bone having a bone quality, the system comprising: an anchor punch comprising an anchor punch sensor; an anchor inserter comprising an anchor inserter sensor; a controller in electrical communication with the anchor punch sensor and the anchor inserter sensor, the controller operative to perform operations comprising: receiving patient data; receiving anchor data; recommending a preliminary number of anchors to be implanted in the bone based on the patient data and the anchor data; receiving an anchor punch sensor signal from the anchor punch sensor; recommending a first adjusted number of anchors to be implanted in the bone based on the anchor punch sensor signal; receiving an anchor inserter sensor signal from the anchor inserter sensor; and recommending a second adjusted number of anchors to be implanted in the bone based on the anchor inserter sensor signal.

In Example 29, the subject matter of Examples 28 optionally includes a suture strain sensor in electrical communication with the controller and attachable to a suture.

In Example 30, the subject matter of any one or more of Examples 28-29 optionally includes that at least one of the first adjusted number of anchors and the second adjusted number of anchors is different than the preliminary number of anchors to be implanted in the bone.

BRIEF DESCRIPTION OF THE FIGURES

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

Corresponding reference characters indicate corresponding parts throughout the several views. The exemplifications set out herein illustrate exemplary embodiments of the disclosure, and such exemplifications are not to be construed as limiting the scope of the disclosure in any, manner.

DETAILED DESCRIPTION

Disclosed herein are systems and methods for implanting one or more anchors into a bone having a bone quality. The systems and methods disclosed herein can utilize an anchor punch. The anchor punch can include a force gauge that can measure a force required to make a hole in the bone for an anchor. The force may differ for each of a plurality of anchors depending on the location of the anchor and the quality of the bone at the location.

During creating holes in the bone for the anchors, an estimation of the hardness of the bone can be determined based on a force needed to make the hole in the bone. Based on the estimation of the hardness, a recommendation of a number of anchors that may be needed based on the quality of the bone can be made to a surgeon. This can be a first recommendation. The first recommendation of a number of anchors can be presented via one or more lights. For example, a color scheme of the lights can be used to signal the recommended number of anchors. For example, a red can indicate a higher number of anchors needed due to poor bone quality. Green can indicate a lower number of anchors due to good bone quality. Using the recommendation, the surgeon can be assisted with procedure planning for the remaining anchors and anchor locations based on the bone quality. This can help prevent anchor pull outs and failures.

An anchor inserter can be used to insert the anchors. The anchor inserter can include a torque gauge, such as in the handle of the inserter. The torque gauge can measure the torque needed to twist the anchor into the bone. The torque measurement can be used to form a second estimate of the quality of the bone. Based on the second estimate of the bone quality, a recommendation on a number of additional anchors that should be inserted into the bone can be made. As disclosed herein, the systems and methods may use the data from the anchor punch and the anchor inserter to make and confirm recommendations for numbers of anchors to be inserted.

Based on the bone quality and/or the hardness of the bone, the bone can support a range of tensions within sutures connected to the anchors. A suture can be equipped with a strain gauge that can be used to determine the tension in the suture. Once the tension within the suture is within the range of tensions, an indication can be provided to the surgeon. The indication can be visual and/or audible. For example, the system can beep and/or illuminate a light once the tension in the sensor is within the range of tensions. As an example, two beeps in succession can be used to indicate the tension has reached a recommended tension for the suture tying.

The above discussion is intended to provide an overview of subject matter of the present patent application. It is not intended to provide an exclusive or exhaustive explanation of the invention. The description below is included to provide further information about the present patent application.

Figure 1:
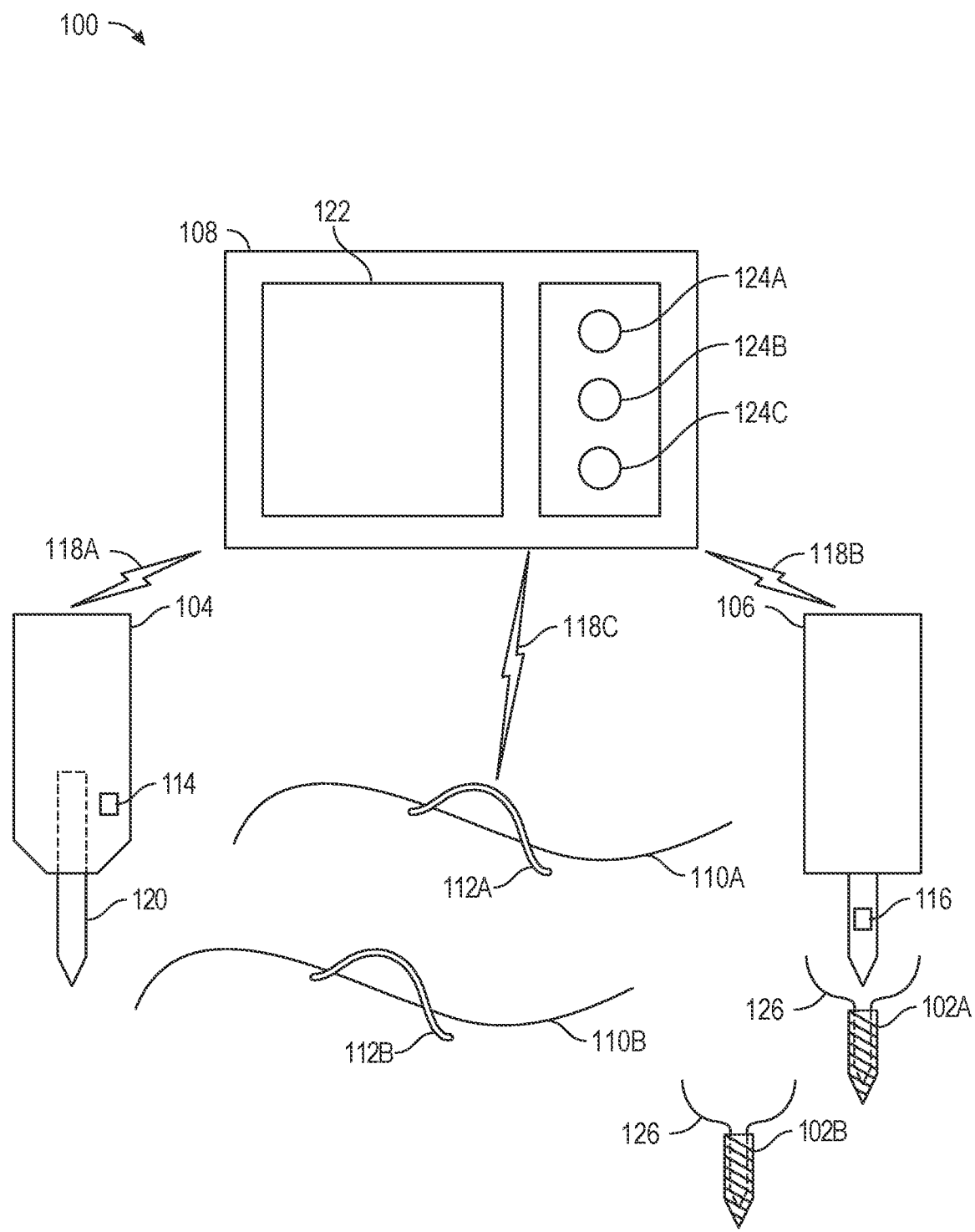
FIG. 1 illustrates a system in accordance with at least one example of this disclosure.

Turning now to the figures, FIG. 1 illustrates a schematic of a system 100 for implanting anchors 102 (labeled individually as anchors 102A and 102B) in a bone in accordance with at least one example of this disclosure. System 100 can include an anchor punch 104, an anchor inserter 106, a controller 108, and sutures 110 (labeled individually as sutures 110A and 110B). Each of sutures 110 can include a strain gauge 112A and 112B (collectively strain gauges 112), respectively. Anchor punch 104 can include an anchor punch sensor 114. Anchor inserter 106 can include an anchor inserter sensor 116. Controller 108 can be in electrical communication with anchor punch sensor 114, anchor inserter sensor 116 and strain gauges 112 as indicated by links 118 (labeled individually as links 118A, 118B, and 118C). Links 118 can be created using wired and/or wireless connections. For example, near field communication and/or BLUETOOTH® modules can be used to create links 118 as disclosed herein.

Anchor punch 104 can include a tip 120 that can be used to punch a hole in bone. Tip 120 can be connected to a spring 122 that has a known spring constant. During operations, anchor punch sensor 114 can measure a displacement of tip 120. Because the spring constant is known, the force exerted on the tip to cause the displacement can be calculated using calibration equations and/or lookup tables. Using the force needed to generate a hole in bone, the hardness and/or quality of the bone can be determined using calibration equations and/or lookup tables. For example, during a punching operation, tip 120 may displace 5 mm. Anchor punch sensor 114 can measure the 5 mm displacement and transmit an electrical signal, sometimes called an anchor punch signal, to controller 108. Controller 108 can use the signal to determine the force needed to generate the hole and a first estimate of the bone quality. For example, if the displacement had been 2 mm, the estimate of the bone quality may indicate a low quality (i.e., softer) bone. If the displacement had been 10 mm, the estimate of the bone quality may indicate higher quality (i.e., harder) bone. In once example, anchor punch 104 can include a durometer used to measure bone hardness. Anchor punch sensor can also include piezoelectric sensors that measure displacement as function of strain, etc.

After a hole has been punched in bone, anchor inserter 106 can be used to insert anchors 102. During insertion of anchors 102 anchor inserter sensor 116 can transmit signals to controller 108, which can be used to form a second estimate of the bone quality and/or hardness. For example, anchor inserter sensor 116 can be a torque gauge. During insertion of anchors 102, anchor inserter sensor 116 can transmit a signal, sometimes called an anchor inserter signal, to controller 108 corresponding to a torque placed on anchors 102. Controller 108 can use the signal in conjunction with calibration formulas and/or lookup tables to determine how much torque a surgeon applied when inserting anchors 102. Controller 108 can use the torque and calibration formulas and/or lookup tables to determine a second estimate of bone quality. For example, a torque of X may indicate hard bone with high quality. A torque of Y, which is less than X, may indicate softer bone with lower quality.

Controller 108 can include a display 122 and/or lights 124 (labeled individually as lights 124A, 124B, and 124C). As disclosed herein, lights 124 can be used to indicate a number of anchors that may be needed for a procedure based on the estimates of the bone quality derived from using anchor punch 104 and anchor inserter 106. For example, light 124A may be a red light, light 124B may be a yellow light, and light 124C may be a green light. Based on one or more signals received from anchor punch sensor 114 and/or anchor inserter signal 116, light 124A may illuminate to indicate poor or low bone quality and thus, an increased number of anchors needed for a given procedure. For example, in a rotator cuff repair procedure, an indication of poor bone quality may result in light 124A illuminating to indicate that 4 anchors are needed. For higher bone quality, light 124C can illuminate to indicate that 2 anchors are needed. For an average bone quality, light 124B can illuminate to indicate 3 anchors.

As disclosed herein display 122 can be a touchscreen display that can allow a surgeon to input information, such as the patient's age, the procedure being performed (e.g., rotator cuff repair, achilleas tendon repair, etc.). Display 122 can also display information such as numbers of recommended anchors. Using the patient's data, which may be preloaded into controller 108 prior to the surgery, the placement of the various anchors may also be displayed.

Sutures 110 can include strain gauges 112, which can be removed from sutures 110. During use, as a surgeon tensions sutures 110, strain gauges 112 can transmit signals, sometimes called suture signals, to controller 108. Controller 108 can use the signals in conjunction with calibration formulas and/or lookup tables to determine a tension within sutures 110. Once the tension in sutures 110 is within a predetermined range, controller 108 can illuminate one or more of lights 124 and/or activate an audible alarm to notify the surgeon that the tension in sutures 110 is within the predetermined range. Sutures 110 can be attached to sutures 126 that extend from anchors 102. In addition, sutures 110 may be sutures 126. Stated another way, sutures 110 may be a component of anchors 102.

Figure 2:
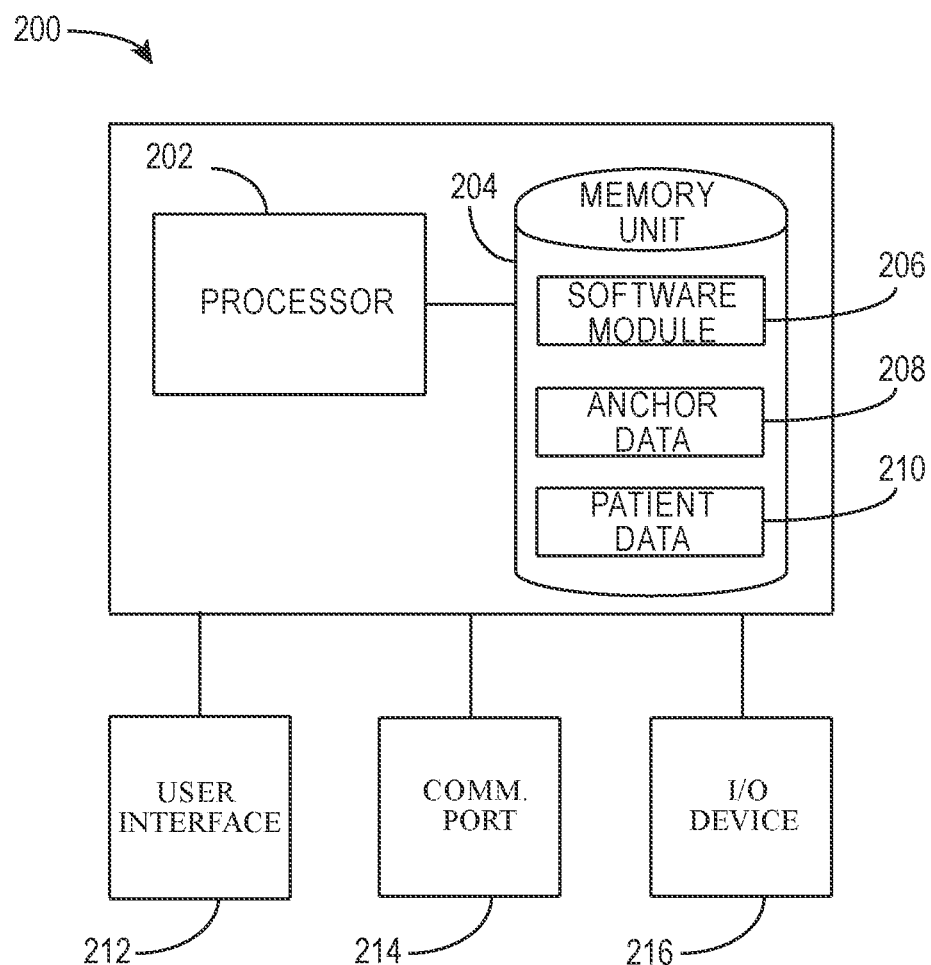
FIG. 2 illustrates a controller in accordance with at least one example of this disclosure.

FIG. 2 illustrates a controller 200, such as controller 108, in accordance with at least one example of this disclosure. Controller 200 can include a processor 202 and a memory 204. Memory 204 may include a software module 206, anchor data 208, and patient data 210. While executing on processor 202, software module 204 can perform processes for measuring bone quality and/or recommending a number of anchors to be implanted in bone, including, for example, one or more stages included in a method 3 described below with respect to FIG. 3. Controller 200 can also include a user interface 212, a communications port 214, and an input/output (I/O) device 216.

As disclosed herein, software module 206 may include instructions that, when executed by processor 202, cause processor 202 to receive signals, such as from anchor punch sensor 120, anchor inserter sensor 116, and/or strain gauges 112 to determine bone hardness and/or quality, and/or recommend a number of anchors to be implanted in bone.

Anchor data 208 may include information that describes and/or otherwise quantifies properties of anchors, such as anchors 102. For example, anchor data 208 any include data that describes the pitch, depth, etc. of threads for anchors. The information may relate to how well the anchor can seat within bone. Other properties can include size (e.g., diameter and length) of the anchors, a tensile strength of a suture, such as suture 126, that extends from an anchor. The anchor data can be for a plurality of different types, sizes, etc. anchors. During use, controller 202 may display, such as on user interface 212, which type of anchor the surgeon can used for a given estimate of bone quality and/or the surgical procedure being performed.

Patient data 210 can include prior estimates of bone quality, patient specific data such as scan (e.g., x-rays, CT scans, etc.) of a patient's anatomy. Controller 200 can use patient data 210 to assist surgeons in selecting anchors (e.g., type, size, etc.) and with determining placement points for the anchors. For example, using scan data from a patient, controller 200 can recommend placement of anchors based on bone curvature, indications of wear on existing bone surfaces, etc.

User interface 212, such as display 122, can include any number of devices that allow a user to interface with controller 200. Non-limiting examples of user interface 212 include a keypad, mouse, a display (touchscreen or otherwise), etc.

Communications port 214 may allow controller 200 to communicate with various information sources and devices, such as, but not limited to, sensors on anchor punches and inserters, remote computing devices such as servers or other remote computers which may contain patient data 210, anchor data 208, etc. Non-limiting examples of communications port 214 include, Ethernet cards (wireless or wired), BLUETOOTH® transmitters and receivers, near-field communications modules, etc.

I/O device 216 may allow controller 200 to receive and output information. Non-limiting examples of I/O device 216 include, anchor punch sensors, anchor inserter sensors, cameras (still or video), etc.

Figure 3:
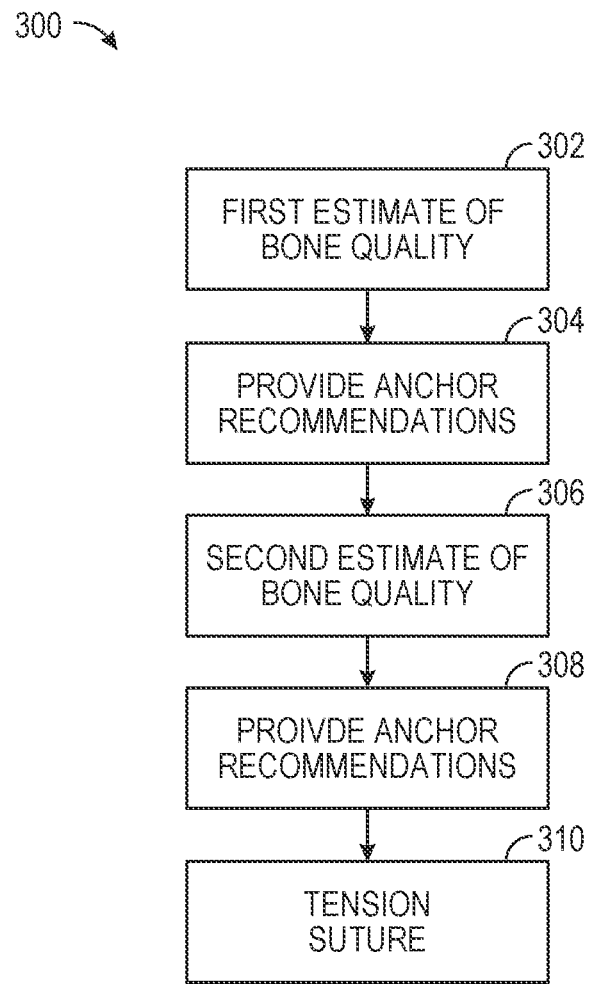
FIG. 3 illustrates a method in accordance with at least one example of this disclosure.

FIG. 3 illustrates a method 300 in accordance with at least one example of this disclosure. Method 300 may begin at stage 302 where a quality of a can be estimated. As disclosed herein, estimating a first bone quality can include receiving an anchor punch sensor signal from an anchor punch sensor. The anchor punch sensor signal can be correlated to the first estimate of the bone quality. For instance, using the anchor punch sensor signal, equations and/or lookup tables can be used to determine the first estimate of the bone quality. Estimating the bone quality can include determining a hardness of the bone based on the anchor punch sensor signal. For example, hard bone can indicate higher quality bone, thus determining a hardness of the bone can indicate a quality of the bone.

Using the first estimate of the bone quality, a number of anchors to be implanted in the bone can be recommended (304). For example, for high quality, healthy bone, X anchors can be recommended for a given procedure. If the first estimate of the quality of the bone indicates low quality (e.g., soft) bone, then Z anchors, where Z is greater than X, can be recommended for the procedure. As disclosed herein, recommending the number of anchors to be implanted in the bone can include illuminating one or more lights corresponding to the number of anchors to be implanted in the bone. The anchor recommendation can also include a recommended placement of the anchors as disclosed herein.

After a number of anchors has been recommended, the anchors can be implanted. During implantation of the anchors, a second estimate of the bone quality can be made (306). As disclosed herein, the second estimate of the bone quality can be based on anchor inserter signals received from an anchor inserter sensor and the anchor inserter signal can be correlated to the second estimate of the bone quality. For instance, the signals received from an anchor inserter can be used in conjunction with equations and/or lookup tables to determine the second estimate of the bone quality. Estimating the bone quality can include determining a hardness of the bone based on the anchor inserter sensor signal. For example, soft bone can indicate lower quality bone, thus determining a hardness of the bone can indicate a quality of the bone.

Based on the second estimate of the bone quality, a number of additional anchors to be implanted in the bone can be recommended (308), For example, of the second estimate of bone quality indicates the bone has a bone quality that is lower, such as by an order of magnitude or more, then additional anchors can be recommended. For instance, if the first estimate of bone quality resulted in a recommendation of two anchors, but the second estimate of bone quality indicates the bone is of poorer quality, then one or two additional anchors can be recommended. The recommendation of additional anchors can also include a recommended placement of the additional anchors as disclosed herein. Recommending the additional anchors can include illuminating one or more lights corresponding to the number of additional anchors to be implanted into the bone.

Once the anchors, and any additional anchors have been implanted, sutures can be tensioned (310). As disclosed herein, a suture strain sensor in electrical communication with a controller can provide signals to the controller to indicate tension within the sutures. Thus, when suture signals are received from the suture strain sensors the tension within the sutures can be determined. When the tension is within a predetermined tension range, an indication can be provided to the surgeon. For example, an audible alarm can be activated when the tension is within the predetermined tension range. The predetermined tension range can be determined based on at least one of the first and second estimates of the bone quality. For example, if the first and/or second estimates of the bone quality indicate the bone is of high quality, then higher tensions may be placed on the sutures since the higher quality bone can better hold the anchors. When first and/or second estimates of the bone quality indicate the bone is of lower quality, then lower tension ranges may be selected, such as from anchor data 208.

In some aspects, there is provided a system for implanting one or more anchors in a bone or bone portion of a patient. This bone or bone portion can have a bone quality. The system can comprise an anchor punch comprising an anchor punch sensor, an anchor inserter comprising an anchor inserter sensor, and a controller in electrical communication with the anchor punch sensor and the anchor inserter sensor. In some cases, the controller can be operative to perform one or more operations such as: receiving patient or patient-related data or information; receiving anchor or anchor-related data or information; and receiving surgical procedure or procedure-related data or information. Based on any of this information or data received or inputted, the controller can then recommend a preliminary number of anchors to be implanted in the bone or bone portion. Thereafter, optionally, the controller can receive an anchor punch sensor signal from the anchor punch sensor, and based on this signal, can make an adjustment to the preliminary number of anchor recommended. For example, the controller can recommend a first adjusted number of anchors to be implanted in the bone (e.g., from 2 anchors to 3 anchors based on determining that the bone quality was less than expected). The first adjusted number of anchors can be less than, greater than, or equal to the preliminary number of anchors recommended. Additionally, the controller can optionally receive an anchor inserter sensor signal from the anchor inserter sensor, and based on this signal, can make an adjustment to the preliminary number of anchors recommended, or in the case of the controller already having made a subsequent adjustment to the preliminary number, the controller can make an adjustment to the first adjusted number of anchors to be implanted in the bone. For example, the controller can recommend a second adjusted number of anchors to be implanted in the bone. In this regard, any of the controller-recommended numbers (e.g., preliminary number, subsequent adjusted numbers such as a first adjusted number, second adjusted number, third adjusted number, etc.) can be the same or different than any of the other recommended numbers depending on the information, data, signals, etc. received by or inputted into the controller. Such a system can also optionally include a suture strain sensor like those discussed elsewhere herein. Such a sensor can be in electrical communication with the controller and be attachable to a suture.

NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for implanting one or more anchors in a bone having a bone quality, the system comprising:
   an anchor punch comprising an anchor punch sensor;
   an anchor inserter comprising an anchor inserter sensor;
   a controller in electrical communication with the anchor punch sensor and the anchor inserter sensor, the controller operative to perform operations comprising:
   receiving an anchor punch sensor signal from the anchor punch sensor, the anchor punch sensor signal correlated to a first estimate of the bone quality;
   recommending a number of anchors to be implanted in the bone based on the first estimate of the bone quality;
   receiving an anchor inserter sensor signal from the anchor inserter sensor, the anchor inserter signal correlated to a second estimate of the bone quality; and
   recommending a number of additional anchors to be implanted in the bone based on the second estimate of the bone quality.

2. The system of claim 1, wherein recommending the number of anchors to be implanted in the bone comprises illuminating one or more lights corresponding to the number of anchors to be implanted in the bone.

3. The system of claim 1, wherein recommending the number of additional anchors to be implanted in the bone comprises illuminating one or more lights corresponding to the number of additional anchors to be implanted in the bone.

4. The system of claim 1, wherein the operations further comprise determining a hardness of the bone based on the anchor punch sensor signal.

5. The system of claim 1, wherein the operations further comprise determining a hardness of the bone based on the anchor inserter sensor signal.

6. The system of claim 1, wherein the anchor punch sensor comprises a durometer.

7. The system of claim 1, wherein the anchor inserter sensor comprises a torque gauge.

8. The system of claim 1, further comprising:
a suture; and
a suture strain sensor in electrical communication with the controller and attached to the suture, wherein the operations further comprise:
receiving a suture signal from the suture strain sensor;
determining a tension within the suture based on the suture signal; and
providing an indication when the tension is within a predetermined tension range.

9. The system of claim 8, further comprising determining the predetermined tension range based on at least one of the first and second estimates of the bone quality.

10. The system of claim 8, wherein providing the indication when the tension is within the predetermined tension range comprises activating an audible alarm.

11. A method for implanting one or more anchors in a bone having a bone quality, the method comprising:
making a hole in the bone with an anchor punch that comprises an anchor punch sensor;
receiving, at a controller, an anchor punch sensor signal from the anchor punch sensor as a result of said making the hole in the bone with the anchor punch, the anchor punch sensor signal correlated to a first estimate of the bone quality;
determining, by the controller, a number of anchors to be implanted in the bone based on the first estimate of the bone quality;
providing, by the controller, an indication of the number of anchors to be implanted in the bone based on the first estimate of the bone quality;
inserting an anchor in the hole with an anchor inserter that comprises an anchor inserter sensor;
receiving, at the controller, an anchor inserter sensor signal from the anchor inserter sensor as a result of said inserting the anchor in the hole with the anchor inserter, the anchor inserter sensor signal correlated to a second estimate of the bone quality;
determining, by the controller, a number of additional anchors to be implanted in the bone based on the second estimate of the bone quality; and
providing by the controller, an indication of the number of additional anchors to be implanted in the bone based on the second estimate of the bone quality.

12. The method of claim 11, wherein proving the indication of the number of anchors to be implanted in the bone based on the first estimate of the bone quality comprises illuminating one or more lights corresponding to the number of anchors to be implanted in the bone.

13. The method of claim 11, wherein providing the indication of the number of additional anchors to be implanted in the bone based on the second estimate of the bone quality comprises illuminating one or more lights corresponding to the number of additional anchors to be implanted in the bone.

14. The method of claim 11, further comprising determining, by the controller, a hardness of the bone based on at least one of the anchor punch sensor signal and the anchor inserter sensor signal.

15. The method of claim 11, further comprising:
tensioning, after inserting the anchor in the hole, a suture connected to the anchor wherein the suture has a suture strain sensor coupled thereto during said tensioning;
receiving, at the controller, a suture strain sensor signal from the suture strain sensor as a result of said tensioning;
determining, by the controller, a tension within the suture based on the suture strain sensor signal; and
providing, by the controller, an indication when the tension is within a predetermined tension range.

16. The method of claim 15, further comprising determining, by the controller, the predetermined tension range based on at least one of the anchor punch sensor signal and the anchor inserter sensor signal.

17. The method of claim 15, wherein said providing the indication when the tension is within the predetermined tension range comprises activating an audible alarm.

18. A system for implanting one or more anchors in a bone having a bone quality, the system comprising:
an anchor punch comprising an anchor punch sensor;
an anchor inserter comprising an anchor inserter sensor;
a controller in electrical communication with the anchor punch sensor and the anchor inserter sensor, the controller operative to perform operations comprising:
receiving patient data;
receiving anchor data;
recommending a preliminary number of anchors to be implanted in the bone based on the patient data and the anchor data;
receiving an anchor punch sensor signal from the anchor punch sensor;
recommending a first adjusted number of anchors to be implanted in the bone based on the anchor punch sensor signal;
receiving an anchor inserter sensor signal from the anchor inserter sensor; and
recommending a second adjusted number of anchors to be implanted in the bone based on the anchor inserter sensor signal.

19. The system of claim 18, further comprising:
a suture strain sensor in electrical communication with the controller and attachable to a suture.

20. The system of claim 18, wherein at least one of the first adjusted number of anchors and the second adjusted number of anchors can be different than the preliminary number of anchors to be implanted in the bone.

* * * * *